US011240469B1

(12) United States Patent
Schoenborn et al.

(10) Patent No.: US 11,240,469 B1
(45) Date of Patent: Feb. 1, 2022

(54) SYSTEMS AND METHODS FOR AUDIENCE INTERACTIONS IN REAL-TIME MULTIMEDIA APPLICATIONS

(71) Applicant: FRQNCY Inc, Portland, OR (US)

(72) Inventors: Theodore Zale Schoenborn, Portland, OR (US); Michael Romay, Portland, OR (US); David Thomas Knape, Portland, OR (US); Lance Troxel, Cottage Grove, OR (US); Ryan Stiles, Portland, OR (US)

(73) Assignee: FRQNCY, INC., Portland, OR (US)

( * ) Notice: Subject to any disclaimer, the term of this patent is extended or adjusted under 35 U.S.C. 154(b) by 0 days.

(21) Appl. No.: 17/127,856

(22) Filed: Dec. 18, 2020

(51) Int. Cl.
| | |
|---|---|
| *H04N 7/15* | (2006.01) |
| *G10L 25/57* | (2013.01) |
| *G06K 9/00* | (2006.01) |
| *H04R 1/40* | (2006.01) |
| *H04R 3/12* | (2006.01) |
| *H04N 5/265* | (2006.01) |
| *H04N 21/44* | (2011.01) |
| *H04N 21/439* | (2011.01) |
| *H04N 21/234* | (2011.01) |
| *H04N 21/233* | (2011.01) |
| *G06N 20/00* | (2019.01) |
| *H04N 21/4788* | (2011.01) |

(52) U.S. Cl.
CPC ........... *H04N 7/15* (2013.01); *G06K 9/00711* (2013.01); *G06N 20/00* (2019.01); *G10L 25/57* (2013.01); *H04N 5/265* (2013.01); *H04N 21/233* (2013.01); *H04N 21/234* (2013.01); *H04N 21/439* (2013.01); *H04N 21/44* (2013.01); *H04N 21/4788* (2013.01); *H04R 1/403* (2013.01); *H04R 3/12* (2013.01); *G06K 2009/00738* (2013.01)

(58) Field of Classification Search
CPC ...... H04N 7/15; H04N 5/265; H04N 21/4788; H04N 21/44; H04N 21/439; H04N 21/234; H04N 21/233; G10L 25/57; G06K 8/00; G06K 9/00; G06N 20/00
USPC ............................................ 348/14.01–14.16
See application file for complete search history.

(56) References Cited

U.S. PATENT DOCUMENTS

| | | | |
|---|---|---|---|
| 10,897,647 B1 * | 1/2021 | Hunter Crawley | ......................... G06K 9/00315 |
| 2011/0295392 A1 * | 12/2011 | Cunnington | ............. H04N 7/15 700/90 |
| 2018/0192000 A1 * | 7/2018 | Mercredi | ........... G06K 9/00302 |
| 2019/0222892 A1 * | 7/2019 | Faulkner | ............ H04N 21/4314 |
| 2020/0059499 A1 * | 2/2020 | Louchheim | ............ H04N 5/265 |
| 2020/0077049 A1 * | 3/2020 | Bright-Thomas | ......................... G06K 9/00718 |

(Continued)

*Primary Examiner* — Melur Ramakrishnaiah
(74) *Attorney, Agent, or Firm* — McCoy Russell LLP

(57) ABSTRACT

Systems and methods for audience interaction in real-time multimedia applications are provided. In one embodiment, a method for a real-time video conference comprises, during the real-time video conference, receiving a media stream including audio and video from a remote computing system over a network, acquiring, video and audio of a user, detecting an event with a machine learning model in at least one of the video and the audio of the user, and transmitting an event detection message indicating the detected event and/or audio and video of the user to the remote computing system over the network. In this way, natural audience reactions may be automatically detected and shared.

20 Claims, 5 Drawing Sheets

(56) References Cited

U.S. PATENT DOCUMENTS

2020/0401880 A1\* 12/2020 Kumbi ................ G06N 3/0454

\* cited by examiner

SYSTEMS AND METHODS FOR AUDIENCE INTERACTIONS IN REAL-TIME MULTIMEDIA APPLICATIONS

FIELD

The disclosure relates to interactive real-time multimedia applications such as video conferences in general, to facilitating audience interactions in interactive real-time multimedia applications in particular.

BACKGROUND AND SUMMARY

The development of interactive real-time multimedia applications such as peer-to-peer video chats or multi-point video conferencing has enabled people to instantaneously communicate with each other through video despite physical distance. Such real-time multimedia applications have had an especially profound impact on the ability to remotely conduct business presentations and meetings, provide educational services through remote learning, and even provide healthcare services through telehealth.

While facilitating meetings between a small number of individuals via real-time multimedia applications is straightforward because the individuals retain a great deal of control over the application, such as the ability to mute or unmute and to speak in turn, larger remote meetings are relatively challenging because not all users may speak at once or view each other on their screens. An additional shortcoming of such real-time multimedia applications is the lack of audience engagement when a person is presenting. For example, a presenter to a large group of viewers in a video conference may feel that a joke has fallen flat because, even if the viewers are all laughing, the participants may be muted in the video conference.

In order to improve the interactivity between participants in a real-time multimedia application, such multimedia applications provide features such as real-time text chat and other methods for user engagement, such as allowing users to click a reaction icon that may be displayed to other users. However, such engagement requires manual input from the users, and the experience of reacting to a joke, for example, is explicitly closer to typing "laughing out loud" rather than actually laughing out loud. Further, such engagement is less useful when the attention of the presenter is focused on the presentation, rather than managing a text chat or scrutinizing small icons in a wall of video boxes on a display. A user could manually unmute themselves so that such a laugh is conveyed, but this action may be disruptive to the presenter as well as other participants in the video conference.

To overcome these limitations of remote meetings, embodiments are disclosed for systems and methods of facilitating audience interactions in real-time multimedia applications. An example method for a real-time video conference comprises receiving, at a computing system from a remote computing system over a network, a media stream including audio and video, acquiring, via a camera and a microphone of the computing system, video and audio of a user of the computing system, detecting, with a machine learning model, an event in at least one of the video and the audio of the user, and transmitting, to the remote computing system over the network, an event detection message indicating the detected event. In this way, the natural reactions of a user may be automatically detected and shared with another user.

Another example method for a real-time video conference comprises acquiring, via a camera and a microphone of a computing system, video and audio of a user of the computing system, transmitting, to a remote computing system over a network, the video and the audio of the user, receiving, from the remote computing system over the network, a media stream and an event detection message indicating an event automatically detected with a machine learning model at the remote computing system in the media stream, and automatically outputting, via an output device of the computing system, the media stream based on the event detection message. In this way, automatically detected audience reactions may be shared with a user in a controlled and non-intrusive manner.

An example system for a real-time video conference comprises a plurality of computing systems including at least a first computing system and a second computing system communicatively coupled via a network and configured to acquire a first media stream and a second media stream, respectively. The first computing system is configured with executable instructions in non-transitory memory that when executed cause a processor of the first computing system to automatically detect, with a machine learning model, an event in the first media stream, the first media stream comprising one or more of audio and video of a user of the first computing system, and transmit, to the second computing system over the network, an event detection message indicating the event. The second computing system is configured with executable instructions in non-transitory memory that when executed cause a processor of the second computing system to receive, from the first computing system over the network, the event detection message, and control an output device of the second computing system to indicate the event to a user of the second computing system responsive to receiving the event detection message.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
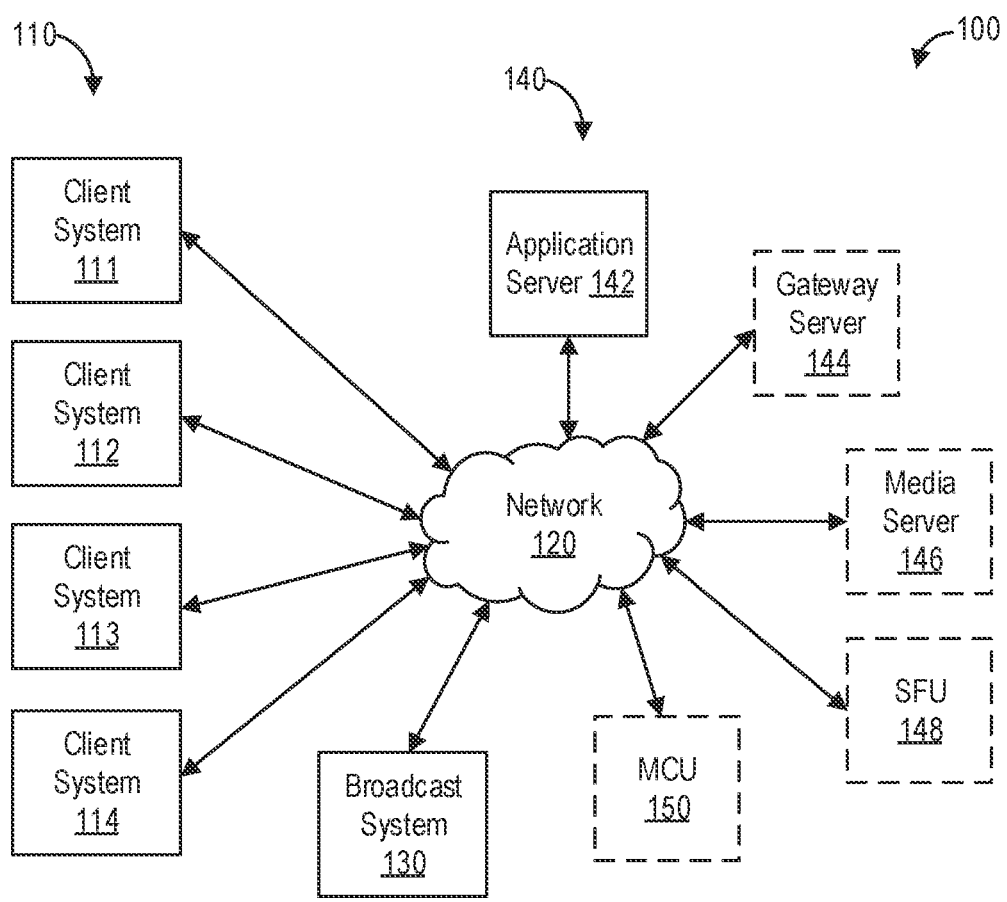
FIG. 1 is a high-level block diagram of an example networked computing environment according to an embodiment.

The following description relates to various embodiments of real-time multimedia applications such as peer-to-peer or multipoint video conferencing. In particular, systems and methods are provided for audience interactions in real-time multimedia applications. For example, as depicted in FIG. 1, a plurality of client systems may be connected via a network to a broadcast system during a video conference, which may be facilitated by one or more servers. One or more users of the broadcast system may broadcast, to the plurality of client systems, a presentation such as a lecture, a musical performance, or another type of presentation. Users of the client systems may view the broadcast presentation while also video conferencing with each other as well as the broadcast system. The client systems may each comprise a computing system, such as the computing system shown in FIG. 2, configured with a machine learning model configured to automatically detect predefined events in audio and/or video captured by the client systems. Such predefined events may comprise audience reactions, such as clapping, cheering, laughing, smiling, raising a hand, and so on.

Figure 3:
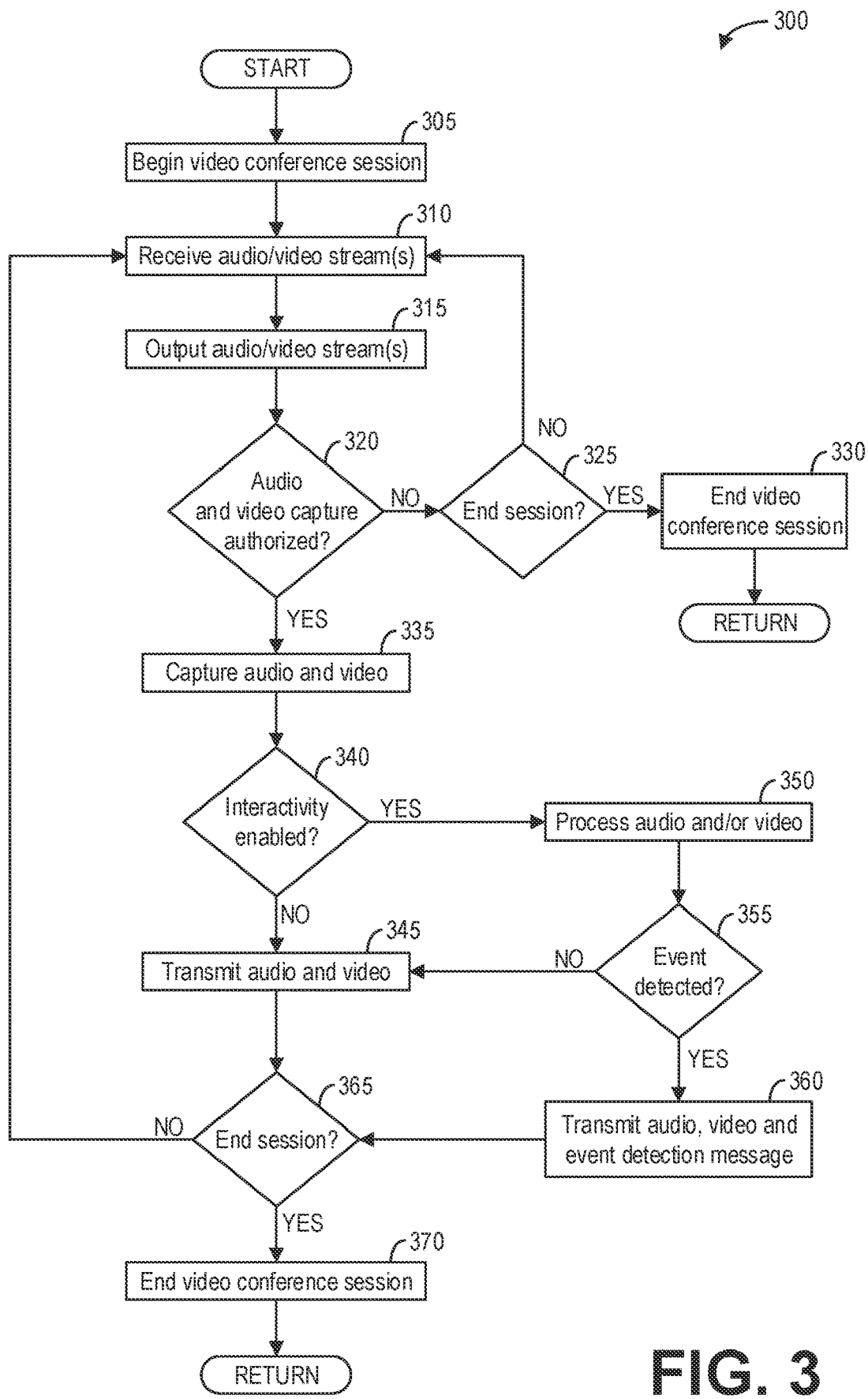
FIG. 3 is a high-level flow chart illustrating an example method for a video conference session for a client system according to an embodiment.

A method for a video conference session with such a client system, such as the method shown in FIG. 3, includes processing the audio and/or video captured by a client system with the machine learning model to automatically detect such audience engagement events, and transmitting event detection messages to the broadcast system when such events are detected. A method for a video conference session with a broadcast system, such as the method shown in FIG. 4, includes selectively controlling output of audio, video, or other output devices such as stage lights, based on event detection messages received from client systems. For example, audio and/or video from client systems may be selectively forwarded to the broadcast system and selectively output when such audio and/or video includes the predefined events. Further, the user of the broadcast system has extensive control over how such output may occur, so that the user may receive the audience feedback in a way that they find useful and non-disruptive. For example, gated audio of clapping may be streamed from client systems to the broadcast system and output via speakers of the broadcast system specifically designated and positioned for audience feedback. In this way, an audience may naturally react to the presentation being broadcast, without manually intervening with their computing system, in a way that will reach the presenter or performer, without distracting the presenter or performer from their presentation or performance.

Figure 5:
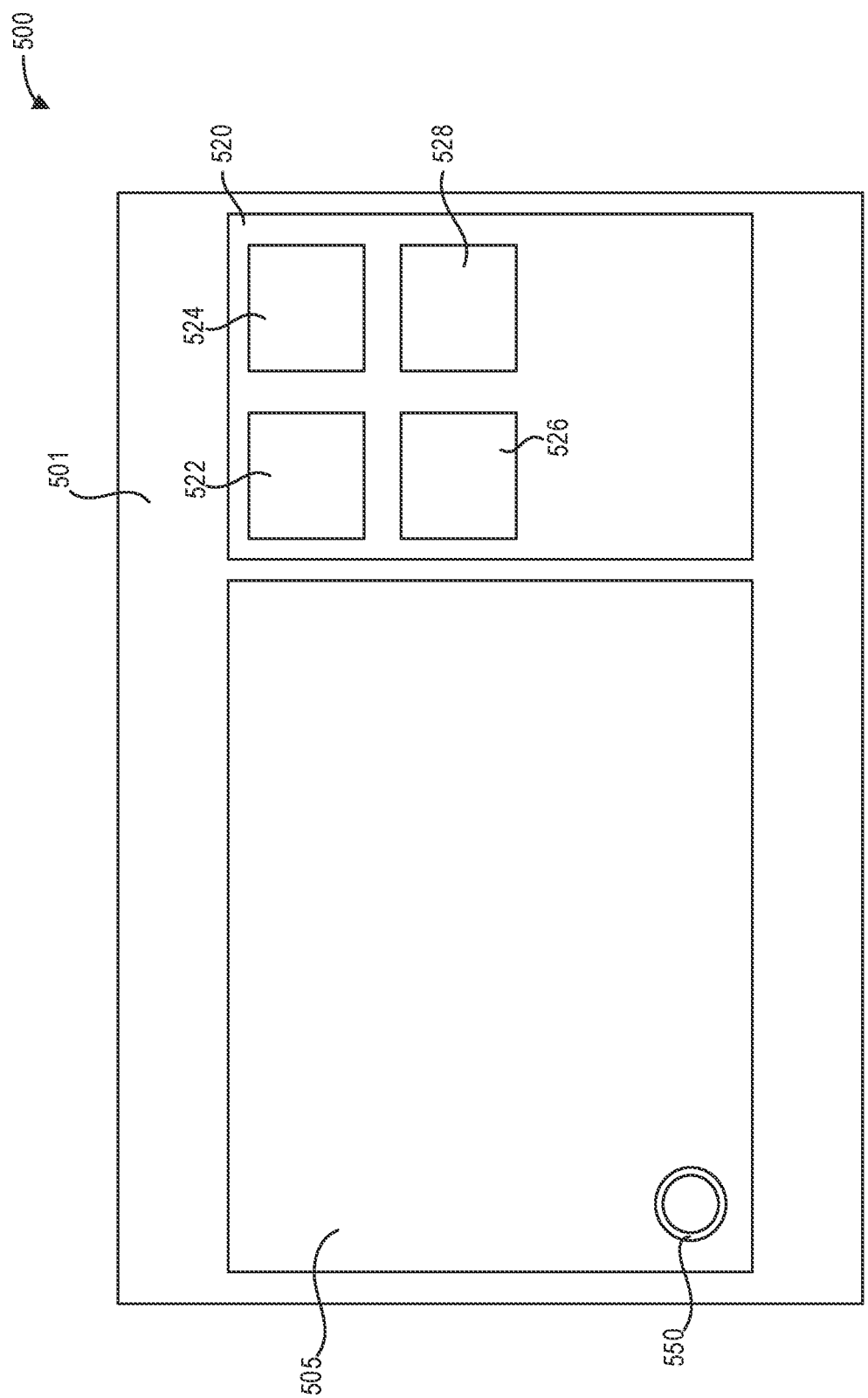
FIG. 5 is a diagram illustrating an example graphical user interface for an interactive video conference session according to an embodiment.

Further, as depicted in the graphical user interface of FIG. 5, users of client systems may be grouped such that they may video conference with each other while viewing the broadcast presentation. In this way, users may communicate with each other in real-time while sharing the experience of viewing a real-time streamed performance. As a result, users of client systems may experience a shared experience of being in an audience with friends despite physical distance from their friends, while users of broadcast systems may benefit from the increased and natural audience feedback.

Turning now to the figures, FIG. 1 shows a high-level block diagram of an example networked computing environment 100 according to an embodiment. The networked computing environment 100 includes a plurality of client systems 110, which may comprise one or more client systems including a first client system 111, a second client system 112, a third client system 113, and a fourth client system 114. The networked computing environment further includes a broadcast system 130 communicatively coupled to the plurality of client systems 110 via a network 120. The broadcast system 130 may comprise a client system of the plurality of client systems 110, for example, but the designation of the client system as a broadcast system 130 indicates that an audio/video stream output by the broadcast system 130 may be prioritized during a video conference session over audio/video streams output by other client systems of the plurality of client systems 110.

The networked computing environment 100 further includes an application server 142. In some examples, the networked computing environment 100 may include a plurality of servers 140 including the application server 142 as well as one or more of a gateway server 144, a media server 144, a selective forwarding unit (SFU) 146, and a multipoint control unit (MCU) 150. The servers of the plurality of servers 140 may be architecturally scalable, such that in some examples the networked computing environment includes one or more application servers 142, one or more gateway servers 144, one or more media servers 146, one or more SFUs 148, and one or more MCUs 150.

It should be appreciated that the four client systems 110, one broadcast system 130, and one application server 142 depicted in FIG. 1 are exemplary, and that in practical embodiments there may be any number of certain elements shown in FIG. 1. For example, the application server 142 may comprise one instance among a large plurality of instances of the application server 142 in a data center, cloud computing environment, or other mass computing environment. Further, the networked computing environment 100 may include thousands or even millions of client systems 110.

The broadcast system 130 and each client system of the plurality of client systems 110 may comprise a computing system including one or more processors such as a central processing unit (CPU) and/or graphics processing unit (GPU), one or more buses, memory organized as volatile and/or nonvolatile storage, one or more data input devices, one or more integrated or separate output devices such as display devices and/or speaker systems, and a communication interface that facilitates communication of the client system with other computing systems via the network 120. The client systems 111, 112, 113, and 114 of the plurality of client systems 110 may comprise any of mobile or stationary computing systems including, but not limited to, desktop computers, laptops, netbooks, tablet computers, smartphones, gaming systems, televisions, and so on. An example computing system that may be implemented as a client system 110 and the broadcast system 130 is described further herein with regard to FIG. 2.

Network 120 may comprise the Internet or one or more public, private, or hybrid wired or wireless networks, including but not limited to an Internet Protocol (IP)-based local area network (LAN), metropolitan area network (MAN), wide area network (WAN), a system-area network (SAN), a Wireless LAN (WLAN) such as a Wireless Fidelity (WiFi) network, and/or a cellular telecommunications network such as a Global System for Mobile Communications (GSM) network, an Evolution-Data Optimized (EV-DO) network, a 3G network, a 4G long term evolution (LTE) network, a 5G network, and so on.

In one example, the application server 142 facilitates or hosts a video conference session and transmits and receives video, image, and audio data to and from each of the client systems 110 and the broadcast system 130 via the network 120. In some embodiments, the plurality of servers 140 may be implemented as the application server 142, such that the application server 142 comprises the gateway server 144, the media server 144, the SFU 148, and the MCU 150. In other embodiments, the servers 140 may be implemented as separate servers, as depicted. In some embodiments, the networked computing environment 100 may include a single application server 142 facilitating a video conference session between a small number of client systems 110, while the networked computing environment 100 may further include a separate plurality of servers configured as the individual plurality of servers 140 depicted in FIG. 1 to facilitate a video conference session between a larger plurality of client systems 110.

The gateway server 144 comprises a central signaling server through which all participating computing systems, such as the client systems 110, the broadcast system 130, and other servers 140 register. The gateway server 144 may handle notifications, authentication requests, and text-based communications (such as text chat) between participating computing systems. The gateway server 144 further maps active sessions to media servers 144 and ensures that media streams are directed to the right computing system, and to that end may be configured with a load balancing algorithm.

The media server 146 comprises a server configured to provide media support for forwarded streaming connections (e.g., via the SFU 148) and mixed streaming connections (e.g., via the MCU 150), including full recording capabilities. The media server 146 notifies client systems 110 when new upstreams are available, when the state of an existing connection changes (e.g., when it closes), when the video layout changes (e.g., for mixed connections), or when quality is adjusted based on network conditions.

The selective forwarding unit (SFU) 148 comprises a server configured to receive media from each participant, and selectively forward the media packets to other participants' devices (e.g., client systems 110 and broadcast system 130). For example, during a video conference session, the broadcast system 130 may transmit audio and video to each client device of the plurality of client devices 110, and so the SFU 148 may forward the media packets from the broadcast system 130 to the plurality of client devices 110. However, as the number of client devices 110 may be arbitrarily large, sending the media packets from each client device of the plurality of client devices 110 to the broadcast system 130 may not be necessary, and so the SFU 148 may selectively forward media packets from a subset of the plurality of client devices 110 to the broadcast system 130, or in some examples the SFU 148 may not forward any media packets from the plurality of client devices 110 to the broadcast system 130. Further, the client devices 110 may be organized into a plurality of groups of client devices, and the SFU 148 may selectively forward media packets from client devices in a group to other client devices within the same group. For example, the first client system 111 and the second client system 112 may be assigned to a first group, while the third client system 113 and the fourth client system 114 may be assigned to a second group; the users of the first and second client systems 111 and 112 may video conference with each other while viewing the main broadcast received from the broadcast system 130, while the users of the third and fourth client systems 113 and 114 may video conference with each other while viewing the main broadcast received from the broadcast system 130. In this way, users may video conference with each other in a group, while together viewing the main broadcast.

The multipoint control unit (MCU) 150 comprises a server configured to receive media from each participant, decodes the media, mixes the audio and video from the participants together into a single stream, encodes the single stream, and sends the encoded single stream to each participant. The MCU 150 may mix media individually for each participant (e.g., for audio), or at least once for video. In this way, individual client systems 110 may simply encode and upload media once and download and decode media once, rather than attempt to handle a plurality of individual media streams, thereby simplifying bandwidth requirements. In examples including the MCU 150, the MCU 150 may mix media packets for client devices according to groups, as described hereinabove with regard to the SFU 148.

Figure 2:
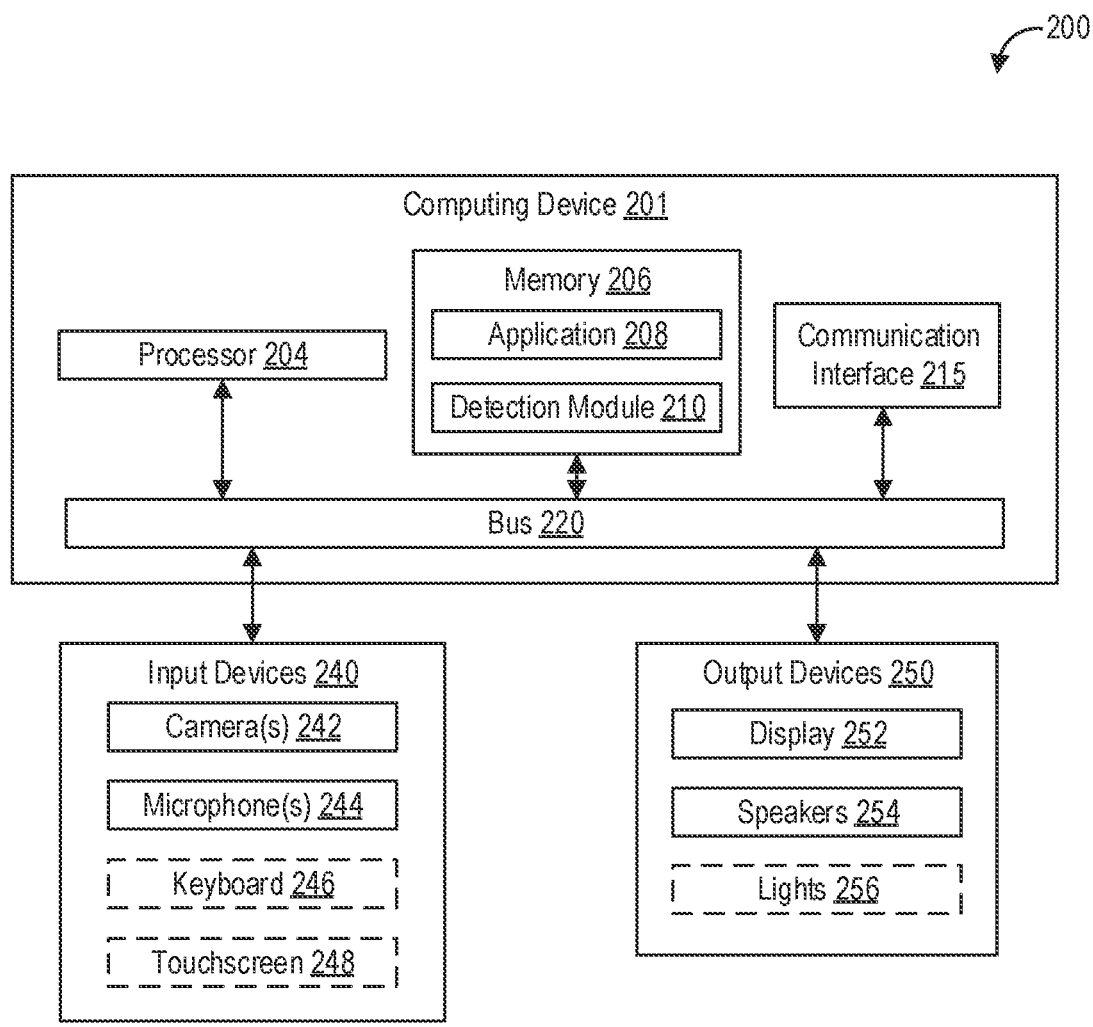
FIG. 2 is a high-level block diagram of an example computing system according to an embodiment.

FIG. 2 shows a high-level block diagram of an example computing system 200 comprising a computing device 201 for interactive video conferencing according to an embodiment. The computing system 200 may comprise the client systems 110 and/or the broadcast system 130, for example. The computing system 200 may comprise a computing system including multiple computing devices, or may comprise a single computing device, including but not limited to a mobile phone, a tablet computer, a laptop computer, a notebook computer, a desktop computer, a home entertainment computer, a network computing device, a gaming device, a server computer, a mobile communication device, and so on.

The computing device 201 comprises a logic subsystem such as a processor 204 and a data-holding subsystem such as a memory 206. The computing device 201 further comprises a communication interface 215, which may comprise one or more wired and/or wireless communication interfaces for sending and receiving data communications, for example via the network 120. For example, the computing device 201 may be configured to execute a browser application that employs a network protocol to communicate with one or more computing devices such as client systems, broadcast systems, and servers.

The processor 204, the memory 206, and the communication interface 215 of the computing device 201 may be communicatively coupled via a bus 220. The computing system 200 further comprises one or more input devices 240 communicatively coupled to the components of the computing device 201 via the bus 220 and configured to receive input from a user of the computing device 201. The one or more input devices 240 may include, but are not limited to, one or more cameras 242 for capturing video as well as one or more microphones 244 for capturing audio. The one or more input devices 240 may optionally including one or more additional input devices, including but not limited to one or more of a keyboard 246, a touchscreen 248, a mouse (not shown), and so on. The one or more input devices 240 may be coupled to the computing device 201, as depicted. Additionally or alternatively, one or more input devices of the one or more input devices 240 may be integrated into the computing device 201.

The computing system 200 further comprises one or more output devices 250 communicatively coupled to the components of the computing device 201 via the bus 220 and configured to output data from the computing device 201 to a user of the computing device 201. The one or more output devices 250 may include, but are not limited to, one or more display devices 252 for displaying one or more graphical user interfaces including one or more videos, and one or more speakers 254 for outputting audio. The one or more display devices 252 may be integrated into the computing device 201, in some examples. Similarly, the one or more speakers 254 may be integrated into the computing device 201, in some examples. In some examples, the one or more speakers 254 and the one or more microphones 244 may be integrated into a wired or wireless headset or wired or wireless earbuds wearable by a user, for example. The one or more output devices 250 may optionally include additional output devices 250 including but not limited to one or more lights 256, which may comprise stage lights. In such examples, the one or more lights 256 may include a lighting controller for facilitating dynamic control of the lights 256 responsive to control signals output by the computing device 201 to the one or more lights 256.

The processor 204 may thus include one or more processors configured to execute software instructions. Additionally or alternatively, the processor 204 may comprise one or more hardware or firmware logic machines configured to execute hardware or firmware instructions. As illustrative and non-limiting examples, the processor 204 may comprise one or more central processing units (CPUs), graphics processing units (GPUs), field-programmable gate arrays (FPGAs), application-specific integrated circuits (ASICs), other hardware configured for real-time media streaming, and so on. The processor 204 may be single or multi-core, and the programs executed thereon may be configured for parallel or distributed processing. The processor 204 may optionally including individual components that are distributed throughout two or more devices, which may be remotely located and/or configured for coordinated processing. Such devices may be connected via the network 120, for example.

The memory 206 of the computing device 201 may comprise one or more physical, non-transitory devices configured to hold data and/or instructions executable by the processor 204 to implement the methods and processes described herein. When such methods and processes are implemented, the state of the memory 206 may be transformed (for example, to hold different data).

In one example, the memory 206 stores executable instructions in the form of an application 208 that when executed by the processor 204 cause the processor 204 to perform a sequence of actions. For example, as described further herein with regard to FIGS. 3 and 4, the application 208 may implement methods for real-time multimedia streaming via the network 120. In particular, execution of the application 208 by the processor 204 may cause the computing device 201 to receive and/or transmit one or more multimedia streams from and/or to other computing devices via the network 120. The application 208 may thus comprise a real-time multimedia application that enables peer-to-peer video chat and/or multi-point video conference sessions, for example.

When the computing system 200 comprises one of the client systems 110, the memory 206 may further store a detection module 210 configured to detect defined events in audio and/or video. The detection module 210 may comprise a machine learning model, such as a deep neural network, trained to detect a particular type of event in audio or video. The type of event detected by the detection module 210 may depend on the context of a video conference session, which in some examples may be selected by a user of the broadcast system 130 or potentially automatically determined by the detection module 210. For example, the event may comprise clapping, cheering, laughing, smiling, raising a hand, dancing, and other actions performed by a user that may be captured in audio and/or video of the user. In some examples, the detection module 210 may optionally pre-process or filter audio and/or video prior to processing the audio and/or video with one or more deep learning models to detect events in the audio and/or video.

When the detection module 210 detects a defined event, such as clapping, in the audio, the detection module 210 generates an event message indicating the event state and the application 208 transmits the event message to the broadcast system 130. When the detection module 210 detects an end of the event, for example when the detection module 210 detects that clapping has ended in the audio, the detection module 210 generates an additional event message indicating the event state and transmits the event message to the broadcast system 130. In particular, the event messages may be transmitted along a dedicated data event channel created for a particular user during the video conference session. The event messages may be formatted to comprise a binary value indicating the event state, such as a first value (e.g., True, +1, 1 and so on) to indicate that an event is occurring and a second value (e.g., False, −1, 0, and so on) to indicate that the event has ended. Further, in examples wherein the detection module 210 monitors and detects more than one type of event, the data event message may further include a value indicating the type of event detected. The broadcast system 130 thus receives data event messages via dedicated data event channels for each user participating in the video conference session. The broadcast system 130 may generate audience feedback in the form of audio or visuals based on the event messages received.

In addition to the data event channel, a dedicated media event channel may also be created for the particular user for selectively transmitting the media (i.e., the sound or the video in which the event occurs) to the broadcast system 130. The application 208 or the detection module 210 may attenuate the beginning and end of the audio corresponding to the event as it is sent via the media event channel to the broadcast system 130. In this way, the media (e.g., the audio and/or the video) in which a defined event is occurring may be selectively transmitted to the broadcast system 130. In examples wherein an MCU 150 is mixing media between computing systems, the MCU 150 may mix all media event signals received via media event channels into a single media event signal for transmission to the broadcast system 130. In examples wherein an SFU 148 is forwarding streaming media between computing systems, the SFU 148 may forward all media event signals to the broadcast system 130, and the broadcast system 130 may then receive and mix the media event signals into a single media event signal.

The broadcast system 130, upon receipt of data event messages and media event signals, may perform an action to convey the user engagement corresponding to the event(s) to the user of the broadcast system 130. For example, if the event comprises clapping and/or cheering, the media event signals may comprise the audio signals of the clapping and/or cheering, which may be output via one or more speakers 254. The one or more speakers 254 may be positioned relative to the user of the broadcast system 130, for example, in the place where an audience may typically be positioned, such that the user (e.g., a performer) may hear the audience feedback from the position where an audience would otherwise be positioned.

Additionally or alternatively, a display 252 may output a visual indicator of the clapping and/or cheering based on the data event messages. For example, depending on the number of data event messages, the display 252 may display a visual indicator that is proportional to the number of data event messages. As a particular example, a size (e.g., number of pixels) and/or a color may be adjusted based on the number of data event messages. In this way, the user of the broadcast system 130 may gauge the number of audience members engaging via clapping and/or cheering at a glance.

As yet another example, the data event messages may be used to control one or more lights 256. For example, the one or more lights 256 may comprise stage lights or other venue effects positioned around the user of the broadcast system 130. The broadcast system 130 may control the one or more lights 256 based on the data event messages. For example, one or more lights 256 may be activated when a threshold number of client devices are transmitting data event messages indicating an event, such that the user of the broadcast system 130 may be informed via the activation of the one or more lights 256 that the audience (i.e., the users of the client devices 110) are engaging in a defined way (e.g., clapping, cheering, laughing, smiling, dancing, raising hands, and so on). Further, the one or more lights 256 may be visible in the video stream from the broadcast system 130, such that the users of the client devices 110 may see that their engagement is affecting the environmental ambiance displayed in the broadcast stream.

It should be appreciated that the examples provided hereinabove for outputting indications of the audience engagement are exemplary and non-limiting, and that other uses for the data event messages and the media event signals are contemplated herein.

Upon loading the application 208 for a video conference session, the detection module 210 may be initially loaded in the background. After initially loading the detection module 210, the detection module 210 may be automatically disabled and maintained in a disabled state until the user expressly enables the detection module 210. In this way, the latency of loading the detection module 210 when the user enables the detection module 210 is minimized because the detection module 210 is initially loaded. Further, by automatically disabling the detection module 210 after the initial loading, consumption of computing resources by the application 208 and the detection module 210 are reduced because the detection module 210 is not running in the background.

In some examples, the application 208 and the detection module 210 may comprise one or more web applications downloaded from an application server 142 or another server such as a content server to a client system, such as one of the client system of the plurality of client systems 110, which may run in a browser application of the client system 110. In particular, the application 208 may comprise a web real-time communication (WebRTC) application that communicates signaling messages to the application server 142 to establish connections with other client systems and/or a broadcast system, and furthermore enables transmission of media with other client systems and/or the broadcast system with or without intervening servers. In examples wherein the application 208 comprises a WebRTC application, the detection module 210 or a deep learning model of the detection module 210 may comprise a JavaScript application, for example, downloaded to the client system from the application server 142 or a content server separately from the application 208, or in some examples may be bundled with the application 208. As an illustrative and non-limiting example, the deep learning model of the detection module 210 may comprise a machine learning library such as TensorFlow implemented with JavaScript (e.g., TensorFlow.js). Thus, the application 208 and/or the detection module 210 may be implemented as a web application such as a WebRTC application, or in some examples may be implemented as a desktop application or another form of application software.

FIG. 3 is a high-level flow chart of an example method 300 for a video conference session for a client system, such as one of the client systems 110, according to an embodiment. In particular, method 300 relates to automatically detecting user engagement events in user audio and/or video during a video conference session. Method 300 is described with regard to the systems and components of FIGS. 1 and 2, though it should be appreciated that method 300 may be implemented with other systems and components without departing from the scope of the present disclosure. Method 300 may be implemented as executable instructions in non-transitory memory, such as memory 206, and may be executed by a processor, such as processor 204, of a computing system, such as computing system 200, configured as a client system of the plurality of client systems 110 in the networked computing environment 100.

Method 300 begins at 305. At 305, method 300 begins a video conference session. To begin a video conference session, method 300 connects the client system to one or more other computing systems, including at least one broadcast system such as broadcast system 130, via the network 120. Further, method 300 may connect the client system to a video conference session already in progress and hosted, for example, via an application server 142 and/or the broadcast system 130.

At 310, method 300 receives one or more audio/video streams. The one or more audio/video streams includes at least an audio/video stream from the broadcast system 130. If the client system is a part of a group channel, the one or more audio/video streams may further include audio/video streams from other client systems in the group channel. Alternatively, the one or more audio/video streams may include all audio/video streams from other client systems participating in the video conference session or no audio/video streams from other client systems participating in the video conference session. The one or more audio/video streams may be received individually from an SFU 148, as a mixed stream from an MCU 150, or on a peer-to-peer basis, as illustrative and non-limiting examples.

At 315, method 300 outputs the one or more audio/video streams. For example, video of the audio/video streams may be displayed via a display device of the client system, while audio of the audio/video streams may be output via one or more speakers of the client system.

At 320, method 300 determines whether audio and video capture are authorized. To determine whether audio and video capture are authorized, method 300 may request connection to one or more microphones of the client system to capture audio and one or more cameras of the client system to capture video, for example, by outputting to the user of the client system such a request. Upon receiving assent from the user of authorization, method 300 may authorize capture of audio and/or video. Authorization may be provided for each session, or in some examples authorization may be previously granted by the user.

If audio and video capture are not authorized ("NO"), method 300 continues to 325. At 325, method 300 determines whether to end the video conference session. If method 300 determines not to end the video conference session ("NO"), method 300 returns to 310 and continues receiving the one or more audio/video streams. Thus, if audio and video capture are not authorized, method 300 continues to receive one or more audio/video streams at 310 and output the one or more audio/video streams at 315 until method 300 determines that audio and video capture is authorized at 320 or until method 300 determines to end the video conference session at 325. If method 300 determines to end the video conference session ("YES") at 325, method 300 proceeds to 330, where method 300 ends the video conference session. Ending the video conference session includes terminating the reception of the one or more audio/video streams. Method 300 then returns. Thus, a user may join a video conference session as a passive participant, wherein method 300 receives the one or more audio/video streams of the video conference session but does not transmit or share audio and/or video of the user.

However, if method 300 determines at 320 that audio and/or video capture is authorized ("YES"), method 300 continues to 335. At 335, method 300 captures audio and/or video, depending on whether one or both are authorized.

At 340, method 300 determines whether interactivity is enabled. Interactivity is enabled if the user of the client system has enabled the detection module 210. For example, as described herein below with regard to FIG. 5, the user may press an interactivity button to activate or enable the detection module 210, and the user may press the interactivity button while the detection module 210 is enabled to disable the detection module 210. Interactivity is thus enabled when the user has enabled the detection module 210.

If interactivity is not enabled ("NO"), method 300 continues to 345. At 345, method 300 transmits the captured audio and video. That is, method 300 transmits the audio and video via the network 120 to another computing system participating in the video conference session, such as another client system 110, a server 140, and/or the broadcast system 130. Method 300 then proceeds to 365, wherein method 300 determines whether to end the video conference session. Method 300 may determine to end the video conference session responsive to the user indicating an end to the video conference session or responsive to receiving a message from a server 140 that the video conference session has ended.

If method 300 determines to not end the video conference session ("NO"), method 300 returns to 310 to continue receiving the one or more audio/video streams. Method 300 thus continues to receive one or more audio/video streams at 310, output the one or more audio/video streams at 315, capture audio and video at 335, and transmit the captured audio and video at 345 until method 300 determines that interactivity is enabled at 340 or until method 300 determines to end the video conference session at 365.

If method 300 determines to end the video conference session ("YES") at 365, method 300 proceeds to 370, where method 300 ends the video conference session. Ending the video conference session includes terminating the reception of the one or more audio/video streams. Method 300 then returns. Thus, a user may join a video conference session as an active participant, where method 300 receives the one or more audio/video streams of the video conference session for output to the user while transmitting or sharing audio and/or video of the user themselves.

Referring again to 340, if method 300 determines that interactivity is enabled ("YES"), method 300 proceeds to 350 to process audio and/or video. For example, method 300 processes the audio and/or the video with the detection module 210. Depending on the type of event being detected, the detection module 210 may process the audio, the video, or both the audio and the video. For example, to detect clapping and cheering, the detection module 210 may process the audio, whereas to detect whether a user is smiling, the detection module 210 may process the video.

At 355, method 300 determines whether an event is detected by the detection module 210. If no event is detected in the audio and/or video ("NO"), method 300 continues to 345. At 345, method 300 transmits the audio and video captured at 335. Method 300 then continues to 365, wherein method 300 determines whether to end the video conference session. If method 300 determines to not end the video conference session ("NO"), method 300 returns to 310 to continue receiving the one or more audio/video streams. Method 300 thus continues to receive audio/video streams at 310, output the audio/video streams at 315, capture audio and video at 335, process the audio and/or video at 350, and transmit the audio and video at 345 until method 300 determines that an event is detected at 355 or to end the video conference session at 365.

Referring again to 355, if method 300 determines that an event is detected ("YES"), method 300 continues to 360. At 360, method 300 transmits the audio and video captured at 335 along with an event detection message. Further, the audio and/or video corresponding to the event may be transmitted separately as a media event signal in a dedicated media event channel assigned to the client system, so that the audio and/or video corresponding to the event may be transmitted to the broadcast system 130 via the media event channel, along with the data event message (i.e., the event detection message) in a dedicated data event channel assigned to the client system. That is, while the audio and video captured by the client system may be transmitted to other client systems in the group channel, for example, the data event message and the media event signal may be transmitted to the broadcast system 130. Method 300 then continues to 365, wherein method 300 determines whether to end the video conference session. Method 300 thus continuously receives audio/video streams at 310, outputs the audio/video streams at 315, captures audio and video at 335, processes the audio and/or video at 350, and either transmits the audio and video alone at 345 when no events are detected at 355, or transmits the audio, video, and an event detection message at 360 when an event is detected at 355, until method 300 determines to end the video conference session at 365.

Once method 300 determines to end the video conference session at 365, method 300 continues to 370. At 370, method 300 ends the video conference session. Ending the video conference session includes terminating the reception of the one or more audio/video streams. Method 300 then returns. Thus, a user may join a video conference session as an active participant with an additional layer of engagement, wherein method 300 receives the one or more audio/video streams of the video conference session for output to the user, transmits audio and/or video of the user, and further transmits event detection messages triggered by events automatically detected in the audio and/or video of the user.

It should be appreciated that the user of the client system may de-authorize the capture of audio and/or video at 320 at any time during the video conference session. It should further be appreciated that the user may enable and/or disable interactivity at 340 at any time during the video conference session.

Figure 4:
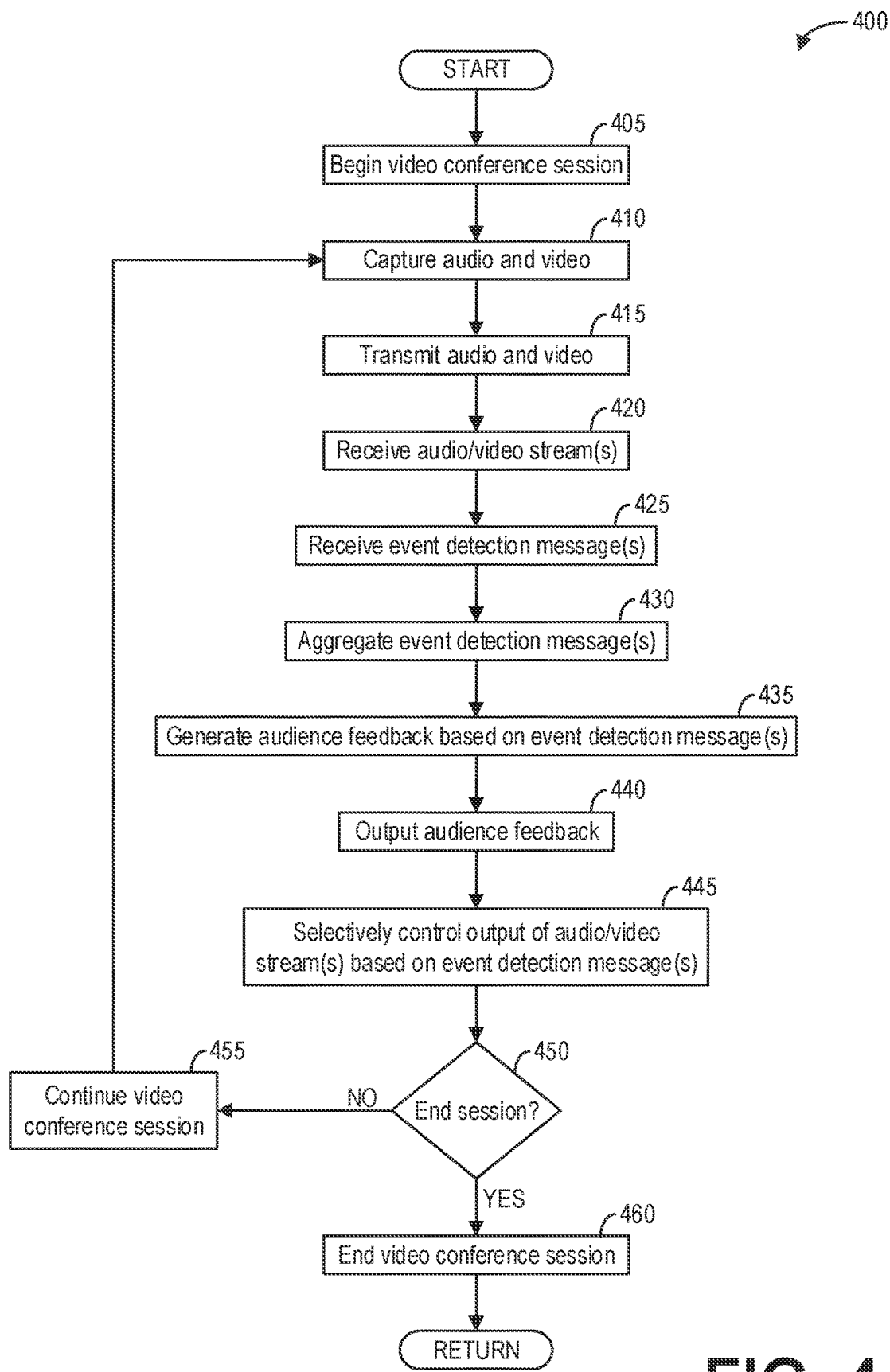
FIG. 4 is a high-level flow chart illustrating an example method for a video conference session for a broadcast system according to an embodiment.

FIG. 4 shows a high-level flow chart illustrating an example method for a video conference session for a broadcast system, such as the broadcast system 130, according to an embodiment. In particular, method 400 relates to outputting audience feedback based on received event detection messages during a video conference session. Method 400 is described with regard to the systems and components of FIGS. 1 and 2, though it should be appreciated that method 400 may be implemented with other systems and components without departing from the scope of the present disclosure. Method 400 may be implemented as executable instructions in non-transitory memory, such as memory 206, and may be executed by a processor, such as processor 204, of a computing system, such as computing system 200, configured as a broadcast system, such as the broadcast system 130 in the networked computing environment 100.

Method 400 begins at 405. At 405, method 400 begins a video conference session. For example, method 400 may connect to one or more other computing systems, such as one or more client systems 110, via a network 120. Method 400 may begin the video conference session by initially communicating with an application server 142 to establish the connection(s) with the one or more client systems 110.

At 410, method 400 captures audio and video, for example via one or more microphones and one or more cameras of the broadcast system 130. At 415, method 400 transmits the audio and video captured at 410. The audio and video may be transmitted to each client system 110 participating in the video conference session. It should be appreciated that the audio and video may be prioritized in the video conference session over media streams from client systems 110, such that the quality of the audio and video transmitted from the broadcast system 130 is maintained at a desired level.

Continuing at 420, method 400 receives one or more audio/video streams. The one or more audio/video streams may include one or more audio, video, or audio and video streams from one or more client systems 110. The one or more audio/video streams may be mixed, for example by an MCU 150, or may be selectively forwarded by an SFU 148, for example. Alternatively, the audio/video streams may include audio, video, or audio and video transmitted by a client system responsive to a detection module at the client system detecting an event, wherein the audio, video, or audio and video correspond to the detected event. That is, the audio/video streams may comprise media event signals transmitted to the broadcast system by one or more client systems via respective media event channels assigned to the one or more client systems.

At 425, method 400 receives one or more event detection messages from one or more client systems via respective data event channels assigned to the one or more client systems. The one or more event detection messages may specify a change in event state (e.g., event occurring or not occurring) as well as a type of event detected, as discussed hereinabove.

At 430, method 400 aggregates the event detection messages. Method 400 may aggregate the event detection messages, as well as any corresponding media event signals received at 420, into event channels and media channels. Method 400 may balance the number of client systems assigned to different event channels and media channels so that the number of client systems in each event channel and media channel is relatively consistent across channels. In some examples, such aggregation of event detection messages and media event signals may occur at an application server 142 or an MCU 150, for example, rather than at the broadcast system 130.

At 435, method 400 generates audience feedback based on the event detection messages. For example, method 400 may generate audience feedback in the form of visual indicators based on the event detection messages. As another example, method 400 may generate audience feedback in the form of synthesized audio based on the event detection messages. As yet another example, method 400 may generate audience feedback in the form of lighting control signals based on the event detection messages. The particular manifestation of audience feedback may vary depending on the implementation of the broadcast system 130, and it should be appreciated that a plurality of techniques for utilizing the event detection messages may be used depending on the context of the video conference session. For example, if the broadcast system 130 is broadcasting a musical performance, the audience feedback may be visual such that the audience feedback may be conveyed to the performer(s) without interfering with the audio, though thresholds may be established such that the audience feedback may be auditory if the number of client systems indicating an event is above the threshold (e.g., if a majority of audience members are clapping or cheering, then generating audio for the performer(s) may be appropriate).

At 440, method 400 outputs the audience feedback. For example, method 400 may output the audience feedback generated at 435 via one or more output devices 250 of the broadcast system 130, including one or more displays 252, one or more speakers 254, one or more lights 256, and so on, depending on the type of audience feedback generated.

At 445, method 400 selectively controls output of the audio/video streams based on the event detection messages. For example, method 400 may selectively output the media event signals from a particular group channel if the event detection messages aggregated in the group channel indicate unanimous events within the group channel. Alternatively, if the audio/video streams comprise the full audio/video streams from client devices rather than media event messages, method 400 may selectively attenuate the audio/video stream for output via the broadcast system 130 based on the event detection messages. As an illustrative and non-limiting example, if the event detected is laughter, method 400 may selectively unmute the audio channels that the event detection messages indicate include laughter.

At 450, method 400 determines whether to end the video conference session. If method 400 determines to not end the video conference session ("NO"), method 400 proceeds to 455 to continue the video conference session. Method 400 returns to 410 to continue capturing audio and video.

Once method 400 determines to end the video conference session ("YES") at 450, method 400 proceeds to 460. At 460, method 400 ends the video conference session. Method 400 then returns.

Thus, the broadcast system 130 may automatically provide audience feedback to user(s) of the broadcast system 130 in a controlled way that does not depend on manual user control. For example, the clapping of a user of a client device may be conveyed to a user of the broadcast device without either user directly controlling the client device or the broadcast device.

FIG. 5 shows a diagram illustrating an example graphical user interface 500 for an interactive video conference session according to an embodiment. The graphical user interface 500 may be displayed on a display screen 501, which may correspond to a display device 252 of a computing system 200 implemented as a client system of the plurality of client systems 110. The graphical user interface 500 may display a broadcast video stream 505, which may be received from a broadcast system 130 for example, as well as a group channel 520 which may include a plurality of video streams received from other client systems 110. For example, the group channel 520 may display a first video stream 522, a second video stream 524, a third video stream 526, and a fourth video stream 528, though it should be appreciated that the number of video streams depicted in the group channel 520 depends on the number of users in the group, the size and resolution of the display screen 501, and so on.

Further, the graphical user interface 500 includes an interactivity button 550 which may be superimposed on the broadcast video stream 505, as depicted, or may be positioned elsewhere in the graphical user interface 500 away from the broadcast video stream 505. The user may press the interactivity button 550, for example by clicking the interactivity button 550, pressing the interactivity button 550 via a touchscreen device, or typing a key (e.g., via a keyboard) to otherwise enable the interactivity button 550.

When pressed, the display of the interactivity button 550 may change from a first state (e.g., a disabled state) to a second state (e.g., an "enabled state") to indicate that the detection module, such as detection module 210, is enabled and is monitoring the audio and/or video for events. In this way, the user may know by viewing the interactivity button 550 that the detection module 210 is enabled. Further, the user may press the interactivity button 550 while the detection module 210 is enabled to disable the detection module 210. Upon disabling the detection module 210, the display of the interactivity button 550 may revert to the disabled state. Further, when the detection module 210 detects an event and thus transmits an event message to the broadcast system 130 indicating the event, the display of the interactivity button 550 may change to a third state (e.g., an event state) indicating that an event is occurring. As just one illustrative and non-limiting example, the interactivity button 550 may be displayed as a gray color in the first state, a blue color in the second state, and an orange color in third state, so that the user may be informed of the status of the interactivity. In embodiments where the interactivity button 550 is superimposed over the broadcast video stream 505 as depicted, the interactivity button 550 may be at least partially transparent.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the computing systems and devices described above with respect to FIGS. 1 and 2. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used herein, the terms "system" or "module" may include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. Various modules or units shown in the attached figures may represent the hardware that operates based on software or hardwired instructions, the software that directs hardware to perform the operations, or a combination thereof.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method for a real-time video conference, comprising:
   receiving, at a computing system from a remote computing system via one or more media servers over a network, a media stream including audio and/or video;
   acquiring, via a camera and/or a microphone of the computing system, video and/or audio of a user of the computing system;
   detecting, at the computing system with a machine learning model, an event in the video and/or the audio of the user; and
   transmitting, to the remote computing system via a data event channel over the network, an event detection message indicating the detected event.

2. The method of claim 1, further comprising:
   detecting, at the computing system with the machine learning model, an end of the event in the video and/or the audio of the user; and
   transmitting, to the remote computing system via the data event channel over the network, an event detection message indicating the detected end of the event.

3. The method of claim 1, further comprising selectively transmitting, to the remote computing system via the one or more media servers over the network, the video and/or the audio of the user including the event responsive to detecting the event, wherein the one or more media servers cease selectively transmitting the video and/or the audio of the user to the remote computing system responsive to the event detection message indicating the detected end of the event.

4. The method of claim 1, wherein the media stream further comprises audio and/or video of a second user from a second computing system, wherein the media server selectively forwards the audio and/or the video of the second user from the second computing system to the computing system with the audio and/or the video from the remote computing system.

5. The method of claim 4, further comprising transmitting, to the second computing system via the one or more media servers over the network, the video and/or the audio of the user.

6. The method of claim 1, wherein the event comprises at least one of clapping, laughing, singing, yelling, talking, or cheering by the user, and wherein the event is detected by the machine learning model in the audio of the user.

7. A method for a real-time video conference, comprising:
   acquiring, via one or more input devices of a broadcast computing system, video and audio of a user of the broadcast computing system;
   transmitting, to a plurality of remote computing systems including a remote computing system via one or more media servers over a network, the video and/or the audio of the user, wherein the one or more media servers selectively forward or mix media streams between the plurality of remote computing systems along with the video and/or the audio of the user;
   receiving, from the remote computing system via the one or more media servers and a data event channel over the network, a media stream acquired at the remote computing system and an event detection message indicating an event automatically detected with a machine learning model at the remote computing system in the media stream; and
   automatically outputting, via an output device of the broadcast computing system, the media stream based on the event detection message.

8. The method of claim 7, further comprising:
receiving, from the remote computing system over the network, an additional event detection message indicating an end of the event automatically detected with the machine learning model in the media stream; and
automatically ceasing output of the media stream via the output device responsive to the additional event detection message.

9. The method of claim 7, wherein the media stream comprises audio of a remote user of the remote computing system, and wherein automatically outputting the media stream comprises automatically outputting the audio of the remote user to at least one speaker of the broadcast computing system and/or at least one audio output of the broadcast computing system connected to an external speaker.

10. The method of claim 7, wherein the media stream comprises video of a remote user of the remote computing system, and wherein automatically outputting the media stream comprises automatically outputting the video of the remote user to at least one display device of the broadcast computing system and/or at least one display output of the broadcast computing system connected to an external display.

11. The method of claim 7, further comprising:
transmitting, to a second remote computing system of the plurality of remote computing systems via the one or more media servers over the network, the video and the audio of the user;
receiving, from the second remote computing system via the one or more media servers over the network, a second media stream and a second event detection message indicating a second event automatically detected with a second machine learning model at the second remote computing system in the second media stream; mixing, wherein the or more media servers mix the media stream and the second media stream into a mixed media stream, wherein receiving the media stream and the second media stream comprises receiving, from the one or more media servers, the mixed media stream; and
automatically outputting, via the output device of the broadcast computing system, the mixed media stream.

12. A system for a real-time video conference, comprising:
one or more media servers;
a broadcast computing system communicatively coupled to the one or more media servers via a network and configured to publish a broadcast media stream; and
a plurality of client computing systems including at least a first client computing system and a second client computing system communicatively coupled to the one or more media servers via the network and configured to acquire a first media stream and a second media stream, respectively, wherein the one or more media servers transmit the broadcast media stream from the broadcast computing system to the plurality of client computing systems, the first media stream from the first client computing system to the second client computing system, and the second media stream from the second client computing system to the first client computing system;
wherein the first client computing system is configured with executable instructions in non-transitory memory that when executed cause a processor of the first client computing system to:
automatically detect, with a machine learning model, an event in the first media stream, the first media stream comprising audio and/or video of a user of the first client computing system; and
transmit, to the one or more media servers and/or a data event channel over the network, an event detection message indicating the event;
wherein the broadcast computing system is configured with executable instructions in non-transitory memory that when executed cause a processor of the broadcast computing system to:
receive, from the first computing system one or more media servers and/or the data event channel over the network, the event detection message; and
control an output device of the broadcast computing system to indicate the event to a user of the broadcast computing system responsive to receiving the event detection message.

13. The system of claim 12, wherein the output device of the broadcast computing system comprises a display device, and wherein the broadcast computing system is configured with executable instructions in non-transitory memory that when executed cause the processor of the broadcast computing system to control the display device to display a visual indicator of the event, the visual indicator dynamically adjusted based on the event detection message.

14. The system of claim 12, wherein the output device of the broadcast computing system comprises an audio output device, and wherein the broadcast computing system is configured with executable instructions in non-transitory memory that when executed cause the processor of the broadcast computing system to control the audio output device to output an indication of the event, the indication of the event comprising one of a synthesized audio output or audio of a portion of the first media stream corresponding to a time when the event is actively detected.

15. The system of claim 12, wherein the plurality of client computing systems further includes a third client computing system communicatively coupled to the one or more media servers via the network and configured to acquire a third media stream.

16. The system of claim 15, wherein the third client computing system is configured with executable instructions in non-transitory memory that when executed cause a processor of the third client computing system to:
automatically detect, with a machine learning model, a second event in the third media stream, the third media stream comprising audio and/or video of a user of the third client computing system; and
transmit, to the one or more media servers and/or the data event channel over the network, a second event detection message indicating the second event;
wherein the broadcast computing system is configured with executable instructions in non-transitory memory that when executed cause the processor of the broadcast computing system to:
receive, from the one or more media servers and/or the data event channel over the network, the second event detection message; and
control the output device of the broadcast computing system to indicate the second event to the user of the broadcast computing system responsive to receiving the second event detection message.

17. The system of claim 16, wherein the output device comprises a plurality of speakers including a first speaker and a second speaker, and wherein the broadcast computing system is configured with executable instructions in non-transitory memory that when executed cause the processor of the broadcast computing system to:
control the first speaker to output an auditory indication of the event and the second speaker to output an auditory indication of the second event.

18. The system of claim 16, wherein the first client computing system and the third client computing system receive the third media stream and the first media stream, respectively, from the one or more media servers over the network with the broadcast media stream.

19. The system of claim 12, wherein the machine learning model comprises a deep neural network executed in a browser of the first client computing system.

20. The system of claim 12, wherein the event comprises one or more of clapping, cheering, talking, yelling, singing, and laughing, and wherein the machine learning model detects the event in the audio of the user of the first client computing system.

\* \* \* \* \*